(12) United States Patent
Parkhurst et al.

(10) Patent No.: US 10,309,857 B2
(45) Date of Patent: Jun. 4, 2019

(54) SYSTEMS AND METHODS FOR DETERMINING AIRCRAFT CENTER-OF-GRAVITY

(71) Applicant: Sikorsky Aircraft Corporation, Stratford, CT (US)

(72) Inventors: Jeffrey Parkhurst, Meriden, CT (US); Jason Satira, Derby, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 167 days.

(21) Appl. No.: 15/364,931

(22) Filed: Nov. 30, 2016

(65) Prior Publication Data
US 2018/0149545 A1     May 31, 2018

(51) Int. Cl.
| | |
|---|---|
| *G01M 1/12* | (2006.01) |
| *B64C 25/60* | (2006.01) |
| *B64D 9/00* | (2006.01) |
| *B64C 29/02* | (2006.01) |
| *B64C 25/04* | (2006.01) |

(52) U.S. Cl.
CPC ............ *G01M 1/125* (2013.01); *B64C 25/04* (2013.01); *B64C 25/60* (2013.01); *B64C 29/02* (2013.01); *B64D 9/00* (2013.01)

(58) Field of Classification Search
CPC ........ G01M 1/12; G01M 1/122; G01M 1/125; B64F 5/60

USPC .............................. 73/65.01, 65.05; 702/169
See application file for complete search history.

(56) References Cited

U.S. PATENT DOCUMENTS

| | | | |
|---|---|---|---|
| 3,701,279 A | 10/1972 | Harris et al. | |
| 5,521,827 A * | 5/1996 | Lindberg | G01G 19/07 177/141 |
| 6,564,142 B2 | 5/2003 | Godwin et al. | |
| 8,340,892 B2 | 12/2012 | Long et al. | |
| 2009/0064769 A1* | 3/2009 | Davis | G01M 1/125 73/65.05 |
| 2010/0100225 A1* | 4/2010 | Reed | B64D 9/00 700/213 |
| 2013/0138376 A1* | 5/2013 | Fordice | G01M 1/122 702/87 |
| 2015/0284075 A1* | 10/2015 | Alber | B64C 39/024 244/12.4 |
| 2016/0195447 A1 | 7/2016 | Nance | |
| 2016/0209290 A1* | 7/2016 | Shue | G01M 1/127 |

* cited by examiner

*Primary Examiner* — Benjamin R Schmitt
(74) *Attorney, Agent, or Firm* — Cantor Colburn LLP

(57) ABSTRACT

A method for determining a center-of-gravity of an aircraft in three dimensions includes determining a first center-of-gravity location for an aircraft in a first plane defined by a first axis and a second axis. The method includes positioning the aircraft in a tilted position by rotating the aircraft and determining a second center-of-gravity location for the aircraft in the first plane in the tilted position. The method includes comparing the first center-of-gravity location to the second center-of-gravity location to determine a component of the first center-of-gravity location along a third axis defined out-of-plane from the first plane to determine a three-dimensional center-of-gravity of the aircraft.

19 Claims, 4 Drawing Sheets

SYSTEMS AND METHODS FOR DETERMINING AIRCRAFT CENTER-OF-GRAVITY

BACKGROUND OF THE INVENTION

1. Field of the Invention

The subject invention is directed to systems and methods for improving the stability of aircraft carrying cargo, and more particularly, directed to systems and methods for determining aircraft center-of-gravity.

2. Description of Related Art

In a winged tail sitter type vertical takeoff and landing (VTOL) aircraft, the fuselage is horizontal for normal forward flight, vertical for hovering or alighting, takeoff and landing, and somewhere in between during the transition.

In some instances, it may be desired to carry cargo loads within the airframe. Even without a load, the stability and center-of-gravity of a winged tail sitter type VTOL aircraft varies across flight modes, e.g. forward flight, hovering/take-off and landing, and transition. Adding a cargo load only further complicates the stability and center-of-gravity issues with the VTOL aircraft.

The conventional techniques have been considered satisfactory for their intended purpose. However, there is an ever present need for improved systems and methods for improving the balance and stability of an aircraft. This disclosure provides a solution for this problem.

SUMMARY OF THE INVENTION

A method for determining a center-of-gravity of an aircraft in three dimensions includes determining a first center-of-gravity location for an aircraft in a first plane defined by a first axis and a second axis. The method includes positioning the aircraft in a tilted position by rotating the aircraft and determining a second center-of-gravity location for the aircraft in the first plane in the tilted position. The method includes comparing the first center-of-gravity location to the second center-of-gravity location to determine a component of the first center-of-gravity location along a third axis defined out-of-plane from the first plane to determine a three-dimensional center-of-gravity of the aircraft.

In accordance with some embodiments, positioning the aircraft includes rotating the aircraft a predetermined amount about at least one of the first or second axes. Determining the first and second center-of-gravity locations can include receiving ground reaction force measurements from at least one force sensor in a landing gear of the aircraft. The first, second and third axes can be mutually orthogonal.

The method can include loading a cargo load into a position in the aircraft. The method can include determining whether the cargo load is in a safe position, a diminished performance position, or an unacceptable position based on the three-dimensional center-of-gravity of the aircraft. The method can include indicating whether the cargo load is in the safe position, the diminished performance position, or the unacceptable position based on the three-dimensional center-of-gravity of the aircraft. The method can include adjusting the position of the cargo load in the aircraft based on the three-dimensional center-of-gravity of the aircraft, for example, adjusting the cargo load if it is in at least one of the diminished performance position or the unacceptable position.

In accordance with another aspect, a three-dimensional center-of-gravity system for an aircraft includes a plurality of force sensors operatively connected to a landing gear of an aircraft for determining at least one center gravity location for the aircraft in a first plane defined by a first axis and a second axis. The system includes a strut operatively connected to the landing gear to position the aircraft in a tilted position by rotating the aircraft. The system includes a module operatively connected to the plurality of force sensors for comparing a first center-of-gravity location to a second center-of-gravity location to determine a component of the first center-of-gravity location along a third axis defined out-of-plane from the first plane to determine a three-dimensional center-of-gravity of the aircraft.

In accordance with some embodiments, the system includes a status indicator operatively connected to the module to provide a status of a cargo load in the aircraft. The strut is an oleo strut. The system can include a valve and a pump operatively connected to the oleo strut to at least one of depress or refill the oleo strut.

In another aspect, A VTOL aircraft includes a fuselage defining a vertical axis and a pair of main wings extending opposite from one another radially outward from the fuselage in a lateral direction with respect to the vertical axis, wherein the main wings define a longitudinal axis. The aircraft includes a plurality of landing gears. Each landing gear is operatively connected to at least one of the main wings or the fuselage. The aircraft includes a three-dimensional center-of-gravity system similar to that recited above. The first plane is defined by the longitudinal axis and a lateral axis normal to both the longitudinal axis and the vertical axis.

In accordance with some embodiments, each force sensor is embedded within a respective one of the landing gears. The VTOL aircraft can include a nacelle supported on each main wing defining a nacelle axis extending parallel to the vertical axis, and a pair of vertical tail wings extending opposite from one another radially outward from each nacelle. The plurality of landing gears are each operatively connected to a respective one of the vertical tail wings.

These and other features of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

Figure 1:
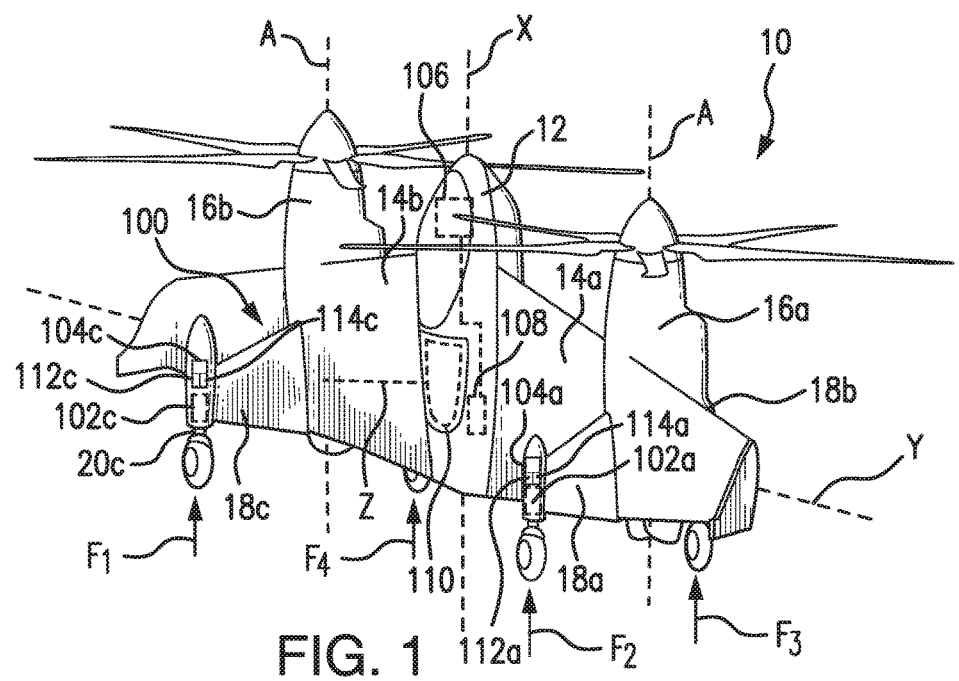
FIG. 1 is a perspective view of a tail sitter aircraft constructed in accordance with the present invention where the axis of the fuselage extending in a vertical orientation, corresponding to a hover, or vertical take-off and/or landing mode, and showing a three-dimensional center-of-gravity system constructed in accordance with the present invention.
Figure 2:
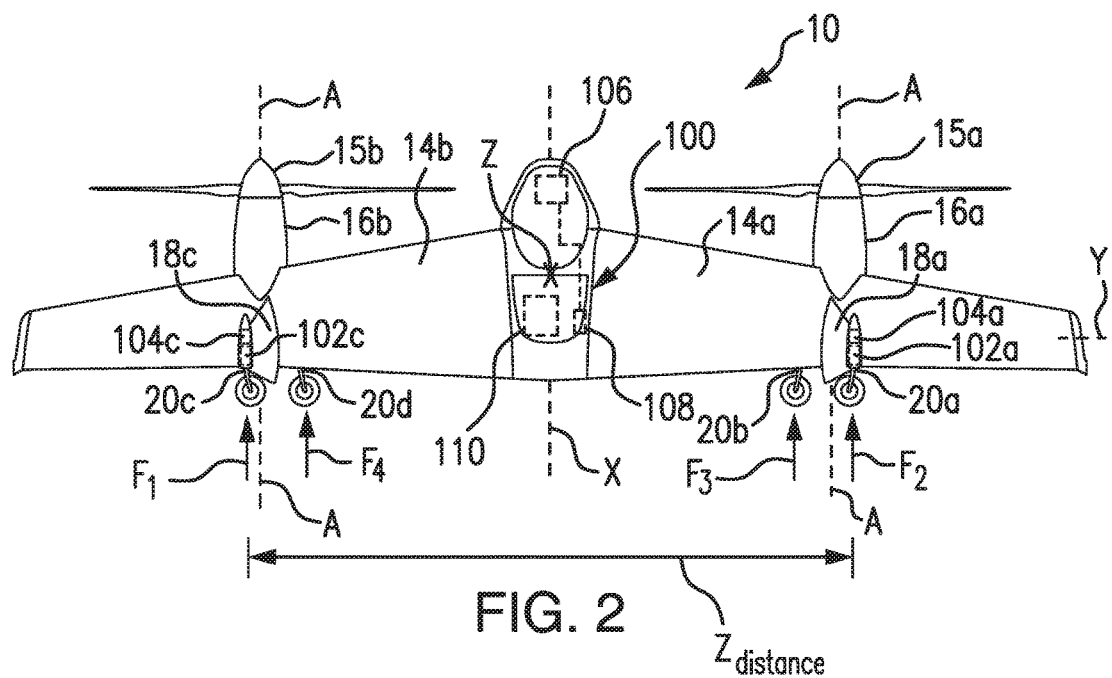
FIG. 2 is a front elevation view of the tail sitter aircraft of FIG. 1, showing the main wings extending in a longitudinal direction opposite from one another radially outward from the fuselage.

Referring now to the drawings, wherein like reference numerals identify similar structural features or aspects of the subject invention. For purposes of explanation and illustration, and not limitation, a schematic depiction of an exemplary embodiment of a rotor blown wing tail sitter aircraft, designated generally by reference numeral 10, is illustrated in FIG. 1. A schematic depiction of an exemplary embodiment of a three-dimensional center-of-gravity system is shown in FIGS. 1 and 2, and is designated generally by reference character 100. Other embodiments of three-dimensional center-of-gravity systems in accordance with the disclosure, or aspects thereof, are provided in FIGS. 3-7, as will be described.

As shown in FIGS. 1-2, tail sitter aircraft 10 includes a fuselage 12 defining a fuselage axis X. As oriented in FIGS. 1 and 2, fuselage axis X is a vertical axis and fuselage 12 of aircraft 10 is in a vertical orientation corresponding to a hovering, and/or take-off and landing flight mode. A pair of main wings 14a and 14b extend opposite from one another radially outward from fuselage 12 in a lateral direction with respect to fuselage axis X. Main wings 14a and 14b define a longitudinal axis Y. Nacelles 16a and 16b are supported on each main wing 14a and 14b, respectively. Each nacelle 16a and 16b defines a respective nacelle axis A extending parallel to fuselage axis X. The nacelles 16a and 16b have respective propellers or rotors 15a and 15b operatively associated therewith. Each nacelle 16a and 16b includes a respective pair of vertical tail wings 18a and 18b, and 18c and 18d. Vertical tail wing 18d is not visible in the figures as oriented, but is similar to vertical tail wings 18a-18c. Each wing 18 in a given pair extends opposite from the other radially outward from each nacelle 16a and 16b. Aircraft 10 includes a plurality of landing gears 20a-20d operatively connected to one of main wings 14a and 14b through a respective one of the vertical tail wings 18a-18d.

Figure 3:
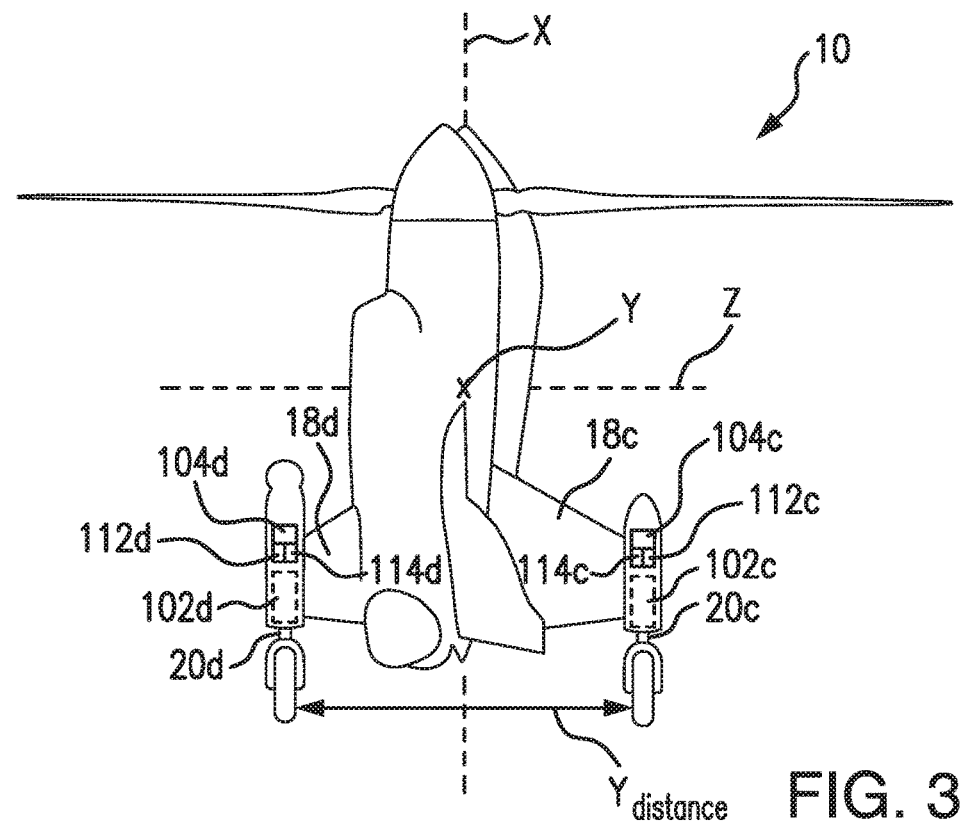
FIG. 3 is a side elevation view of the tail sitter aircraft of FIG. 1, showing a respective pair of vertical tail wings extending in a lateral direction from a nacelle of the aircraft.

With reference now to FIGS. 2 and 3, aircraft 10 includes a three-dimensional center-of-gravity system 100. In some embodiments, all of or portions of system 100 are autonomous. Three-dimensional center-of-gravity system 100 for aircraft 10 includes a plurality of force sensors 102a-102d embedded within a respective one of the landing gears 20a-20d of aircraft 10 for determining at least one center gravity location for aircraft 10 in a first plane. As oriented in FIG. 1, the first plane is defined by the longitudinal axis Y and a lateral axis Z. Lateral axis Z is normal to both the longitudinal axis Y and the vertical axis X. System 100 includes struts 104a-104d operatively connected to respective landing gears 20a-20d. Each strut 104a-104d is an oleo strut. It is also contemplated that more or less than four struts 104a-104d can be used, or other non-oleo struts can be used. Strut 104d associated with landing gear 20d is not visible in the views shown by the figures, but would be similar to struts 104a-104c. System 100 includes valves 112a-112d and pumps 114a-114d operatively connected to each strut 104a-104d to depress and/or refill the strut to tilt aircraft 10, as described in more detail below.

As shown in FIGS. 1 and 2, system 100 includes a module 106 operatively connected to force sensors 102a-102d for determining a center-of-gravity of an aircraft in three dimensions, as will be described below. System 100 includes a status indicator 108 operatively connected to module 106 to provide a status of a cargo load 110 in aircraft 10. Module 106 compares the three-dimensional center-of-gravity readings to pre-determined ranges to determine if cargo load 110 is in a safe position, a diminished performance position, or an unacceptable position. For example, if cargo load 110 is determined by module 106 to be in a safe position, status indicator 108 will display a green light, emit an audible signal, or provide another indicator. Status indicator 108 provides differing indicators depending on the position, e.g. a red light for an unacceptable position and a yellow light for a diminished performance position. It is also contemplated that status indicator 108 can provide a corrective action, e.g. raise or lower cargo load to a certain aircraft station.

Figure 5:
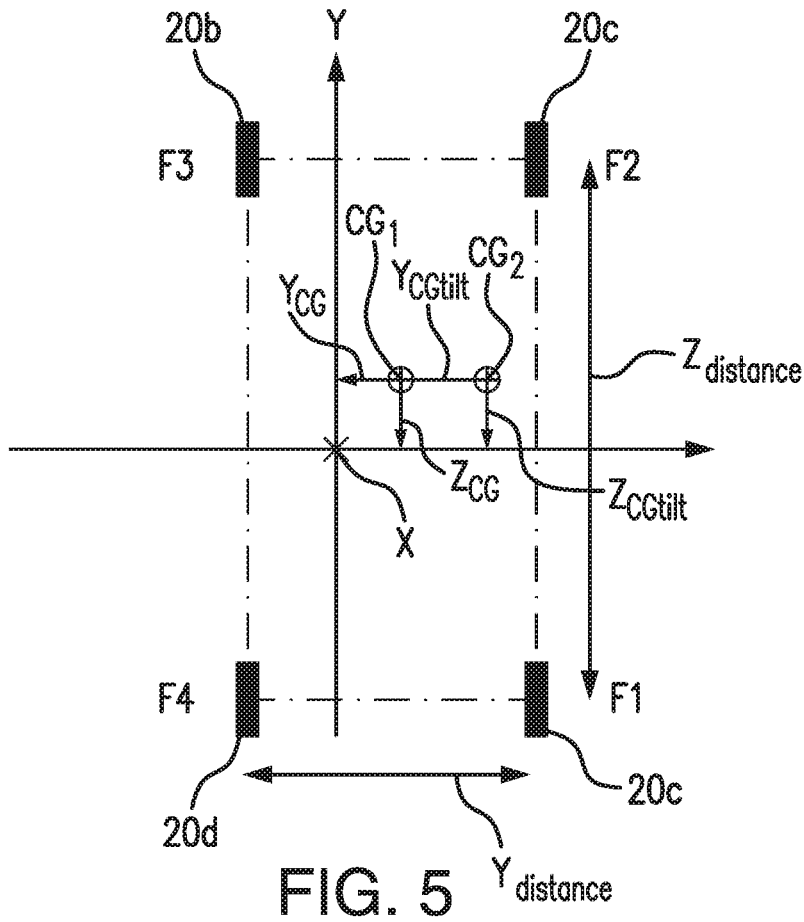
FIG. 5 is a top elevation view of a schematic diagram of the landing gears of the tail sitter aircraft of FIG. 1, showing the relationship between ground reaction forces acting on the landing gears and the center-of-gravity in an un-tilted and a tilted position.

With continued reference to FIGS. 2, 3 and 5, aircraft 10 is shown in a first un-tilted position. In this first position, a first center-of-gravity location $CG_1$ in the first plane is determined by summing the moments about the longitudinal axis Y and lateral axis Z. This is determined by using ground reaction force data gathered from sensors 102a-102d (ground reaction forces are indicated schematically by upward pointing arrows in FIGS. 1-2), and the known distances between the measured forces, e.g. the distance between landing gears 20a-20d, in the Y and Z directions. With the known forces, distances and aircraft weight (W), the respective points where the sum of the moments about each axis is zero (e.g. the center-of-gravity) can be determined, for example, using the following equations:

$$\Sigma_{MomentsZ} = (F1+F4)*(Z_{distance}/2) - (F2+F3))*(Z_{distance}/2) - W*Z_{CG} = 0$$

$$\Sigma_{MomentsY} = (F1+F2)*(Y_{distance}/2) - (F4+F3))*(Y_{distance}/2) + Y_{CG} = 0$$

Forces (F1-F4) are known through readings from the force sensors 102a-102d and the distances of the forces away from Z and Y axes, $Z_{distance}$ and $Y_{distance}$, respectively, are known by pre-determined measurements between the landing gears 20a-20d. With the above equations, and the known weight, forces and distances, $CG_1$ can be determined by solving for $Z_{CG}$ and $Y_{CG}$.

Figure 4:
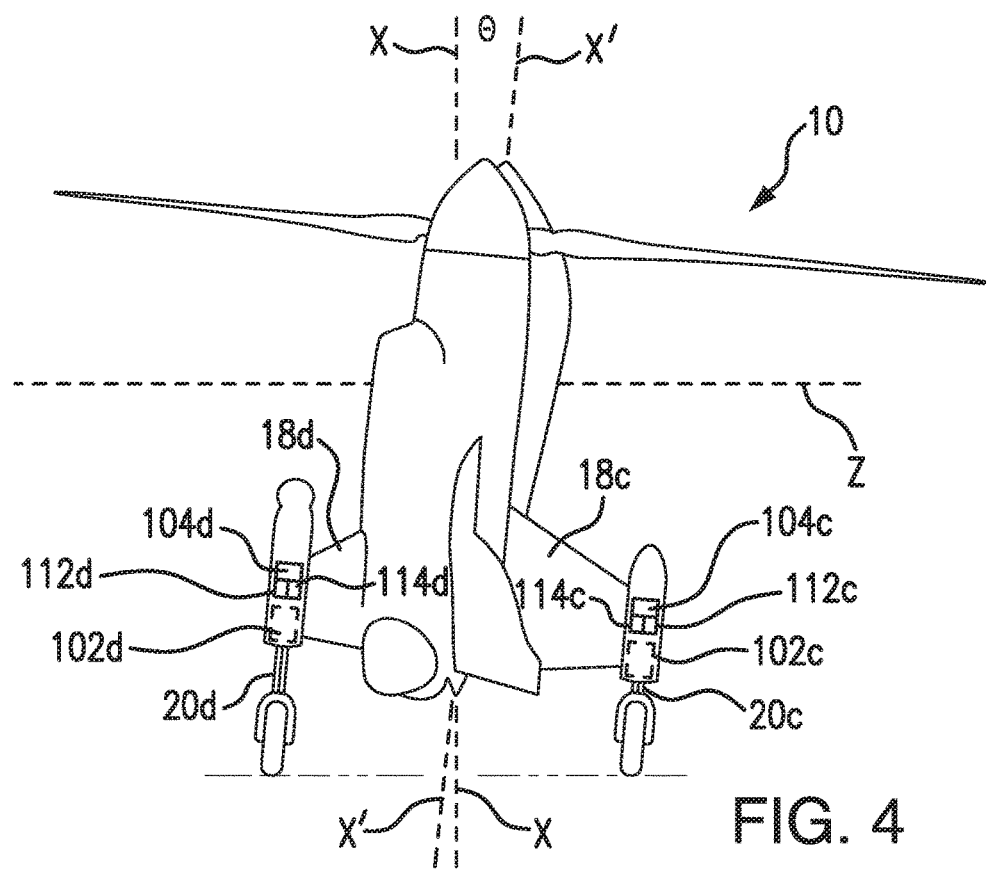
FIG. 4 is a side elevation view of the tail sitter aircraft of FIG. 1, showing the aircraft in a tilted position.

With reference now to FIGS. 4 and 5, aircraft 10 is shown in a tilted position. Aircraft 10 is shown tilted by a pre-determined angle θ about longitudinal axis Y such that the fuselage axis X is tilted to X'. Struts 104d and 104b are inflated to rotate aircraft 10 about axis Y to the tilted position. In the alternative, it is also contemplated that struts 104d and 104b can be deflated to achieve the tilted position.

In this tilted position, a second center-of-gravity location $CG_2$ in the first plane is determined by again summing the moments about the longitudinal axis Y and lateral axis Z to determine $Z_{CGtilt}$ and $Y_{CGtilt}$. This is determined by using force data gathered from sensors 102a-102d in the tilted position and the known distances between the measured forces, e.g. the distance between landing gears 20a-20d, in the Y and Z directions. With the known forces, distances and aircraft weight (W), the respective points where the sum of the moments about each axis is zero (e.g. the center-of-gravity) can be determined in the tilted position, for example, by using the following equations:

$$\Sigma_{MomentsZ}=(F1+F4)*(Z_{distance}/2)-(F2+F3))*(Z_{distance}/2)-W/Z_{CGtilt}=0$$

$$\Sigma_{MomentsY}=(F1+F2)*(Y_{distance}/2)-(F4+F3))*(Y_{distance}/2)+W/Z_{CGtilt}=0$$

Forces (F1-F4) are known through readings from the force sensors 102a-102d in the tilted position and the distances of the forces away from Z and Y axes, $Z_{distance}$ and $Y_{distance}$, respectively, are known by pre-determined measurements between the landing gears 20a-20d. With the above equations, and the known weight, forces and distances, $CG_2$ can be determined by solving for $Z_{CG}$ and $Y_{CG}$ in the tilted position, e.g. $Z_{CGtilt}$ and $Y_{CGtilt}$.

Figure 6:
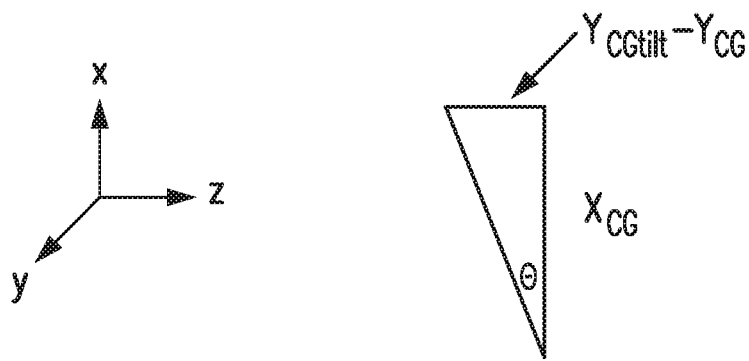
FIG. 6 is a schematic depiction of the relationship between the vertical center-of-gravity of the aircraft of FIG. 1 and the change in center-of-gravity of the aircraft of FIG. 1 between the un-tilted and the tilted position.

As shown in FIGS. 5 and 6, one of the components of the $CG_2$ location, in this case $Y_{CGtilt}$, is compared with its respective counterpart from the $CG_1$ location, in this case, $Y_{CG}$. By using pre-determined angle θ and the difference between the $Y_{CGtilt}$ location and the $Y_{CG}$ location, a center-of-gravity position in a third direction $X_{CG}$, along axis X normal to the first plane, e.g. fuselage axis X, can be determined using, for example, the following equation:

$$X_{CG}=(Y_{CGtilt}-Y_{CG})/\mathrm{Tan}(\theta)$$

It is contemplated that $X_{CG}$ can similarly be determined using a comparison between $Z_{CGtilt}$ and $Z_{CG}$ depending on the tilt direction of aircraft 10.

Figure 7:
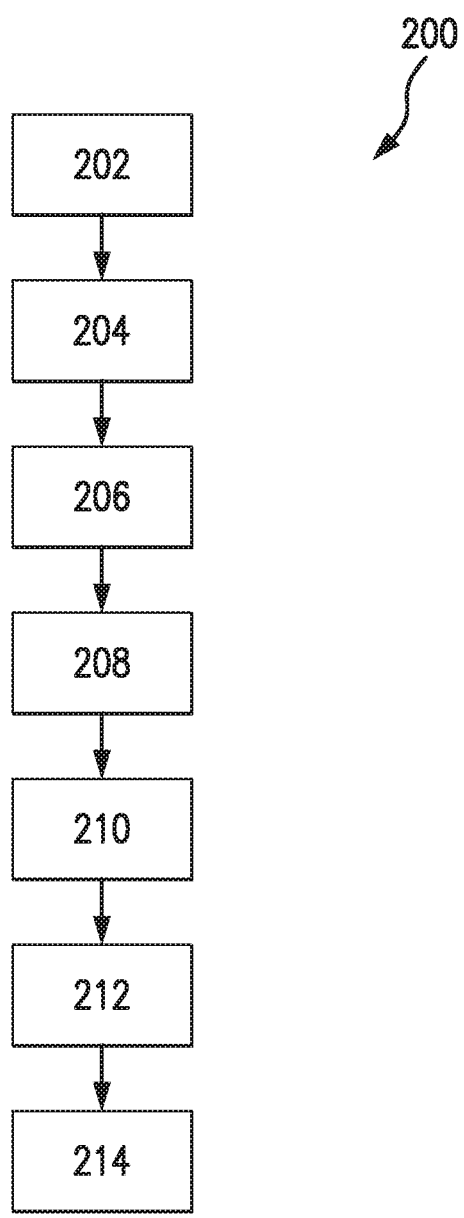
FIG. 7 is a diagram of a method of determining a center-of-gravity of an aircraft in three dimensions in accordance with an exemplary embodiment of the present disclosure.

With reference now to FIGS. 5-7, a method 200 for determining a center-of-gravity of an aircraft, e.g. aircraft 10, in three dimensions includes loading a cargo load, e.g. cargo load 110, into a position in the aircraft, as indicated schematically by box 202. Method 200 includes determining a first center-of-gravity location, e.g. $CG_1$, for an aircraft, e.g. aircraft 10, in a first plane defined by a first axis, e.g. longitudinal axis Y, and a second axis, e.g. lateral axis Z, as indicated schematically by box 204. Method 200 includes positioning the aircraft in a tilted position by rotating the aircraft, as indicated by box 206. Positioning the aircraft includes rotating the aircraft a predetermined amount about at least one of the first or second axes, e.g. longitudinal axis Y and lateral axis Z. Method 200 includes determining a second center-of-gravity location, e.g. $CG_2$, for the aircraft in the first plane in the tilted position, as indicated schematically by box 208. Determining the first and second center-of-gravity locations, as indicated schematically by boxes 204 and 208, includes receiving ground reaction force measurements force sensors, e.g. force sensors 102a-102d, in respective landing gears, e.g. landing gear 20a-20b, of the aircraft.

With continued reference to FIG. 7, method 200 includes comparing the first center-of-gravity location to the second center-of-gravity location to determine a component of the first center-of-gravity location, e.g. $X_{CG}$, along a third axis, e.g. fuselage axis X, defined out-of-plane from the first plane to determine a three-dimensional center-of-gravity of the aircraft, as shown by box 210. Using the three-dimensional center-of-gravity of the aircraft, method 200 includes determining whether the cargo load is in a safe position, a diminished performance position, or an unacceptable position based, as indicated schematically by box 212. It is also contemplated that the position of the cargo load can conveyed using a status indicator, e.g. status indicator 108. Method 200 includes adjusting the position of the cargo load in the aircraft based on the three-dimensional center-of-gravity of the aircraft, e.g. based on whether the cargo load is in a safe position, a diminished performance position, or an unacceptable position, as indicated schematically by box 214. For example, the position of the cargo load can be adjusted if it is in at least one of the diminished performance position or the unacceptable position. The steps of method 200 can be performed multiple times until the user or other automated system is satisfied with the position indicated by the status indicator. In standard aircraft, a two-dimensional center-of-gravity location is typically all that is needed. For tail sitter aircraft, however, where the axes are re-oriented with respect to gravity, a three-dimensional center-of-gravity location is important for balancing aircraft 10 during all flight modes.

The methods and systems of the present disclosure, as described above and shown in the drawings, provide for systems and methods to determine a center-of-gravity of an aircraft in three dimensions, such as tail-sitter aircraft, with superior properties including ease of cargo loading onto a tail-sitter aircraft. While the apparatus and methods of the subject disclosure have been shown and described with reference to preferred embodiments, those skilled in the art will readily appreciate that modifications may be made thereto without departing from the spirit and scope of the subject disclosure.

What is claimed is:

1. A method for determining a center-of-gravity of an aircraft in three dimensions, the method comprising:
    measuring ground reaction forces at a plurality of force sensors with the aircraft in an un-tilted position, each force sensor embedded within a respective landing gear;
    determining, from the ground reaction forces measured with the aircraft in the un-tilted position, a first center-of-gravity location for the aircraft in a first plane defined by a first axis and a second axis;
    controlling a plurality of struts to position the aircraft in a tilted position by rotating the aircraft, each strut associate with a respective landing gear;
    determining, from the ground reaction forces measured with the aircraft in the tilted position, a second center-of-gravity location for the aircraft in the first plane;
    comparing the first center-of-gravity location to the second center-of-gravity location to determine a component of the first center-of-gravity location along a third axis defined out-of-plane from the first plane to determine a three-dimensional center-of-gravity location of the aircraft; and
    moving a load of the aircraft to a location along the third axis that provides stability for horizontal and vertical flight modes, based on the component of the first center-of-gravity location along the third axis.

2. The method as recited in claim 1, wherein positioning the aircraft includes rotating the aircraft a predetermined amount about at least one of the first or second axes.

3. The method as recited in claim 1, wherein determining the first and second center-of-gravity locations includes receiving ground reaction force measurements from at least one force sensor in a landing gear of the aircraft.

4. The method as recited in claim 1, wherein the first, second and third axes are mutually orthogonal.

5. The method as recited in claim 1, further comprising loading a cargo load into a position in the aircraft.

6. The method as recited in claim 5, further comprising determining whether the cargo load is in a safe position, a diminished performance position, or an unacceptable position based on the three-dimensional center-of-gravity of the aircraft.

7. The method as recited in claim 6, further comprising indicating whether the cargo load is in the safe position, the diminished performance position, or the unacceptable position based on the three-dimensional center-of-gravity of the aircraft.

8. The method as recited in claim 7, further comprising adjusting the position of the cargo load in the aircraft if the cargo load is in at least one of the diminished performance position or the unacceptable position.

9. A three-dimensional center-of-gravity system for an aircraft, the system comprising:
    a plurality of landing gears, each landing gear including:
        a force sensor in the landing gear for measuring a ground reaction force on the landing gear;
        a strut controllable to position the aircraft in a tilted position by rotating the aircraft; and
    a module operatively connected to the struts and the force sensors of the plurality of landing gears for:
        determining, from ground reaction forces measured by the force sensors with the aircraft in an un-tilted position, a first center gravity location for the aircraft in a first plane defined by a first axis and a second axis;
        controlling the struts to rotate the aircraft by an angle about one of the first axis and second axis to the tilted position;
        determining, from ground reaction forces measured by the force sensors with the aircraft in the tilted position, a second center of gravity location in the first plane for the tilted aircraft;
        comparing the first center-of-gravity location to the second center-of-gravity location to determine a component of the first center-of-gravity location along a third axis defined out-of-plane from the first plane to determine a three-dimensional center-of-gravity location of the aircraft; and
        moving a load of the aircraft to a location along the third axis that provides stability for horizontal and vertical flight modes, based on the component of the first center-of-gravity location along the third axis.

10. The system as recited in claim 9, further comprising a status indicator operatively connected to the module to provide a status of a cargo load in the aircraft.

11. The system as recited in claim 9, wherein the strut is an oleo strut.

12. The system as recited in claim 11, further comprising a valve and pump operatively connected to the oleo strut to at least one of depress or refill the oleo strut.

13. A VTOL aircraft, comprising:
    a fuselage defining a vertical axis;
    a pair of main wings extending opposite from one another radially outward from the fuselage in a lateral direction with respect to the vertical axis, wherein the main wings define a longitudinal axis;
    a plurality of landing gears, each landing gear operatively connected to at least one of the main wings or the fuselage; and
    a three-dimensional center-of-gravity system including:
        a plurality of force sensors, each force sensor operatively connected to a respective one of the landing gears for measuring a ground reaction force on the landing gear; and
        a plurality of struts, each strut operatively connected to a respective one of the landing gears and controllable to position the aircraft in a tilted position by rotating the aircraft; and
        a module operatively connected to the plurality of force sensors and the plurality of struts, the module configured to:
            determine, from ground reaction forces measured by the plurality of force sensors with the aircraft in an un-tilted position, a first center gravity location for the aircraft in a first plane defined by a first axis and a second axis;
            control the struts to rotate the aircraft by an angle about one of the first axis and second axis to the tilted position;
            determine, from ground reaction forces measured by the force sensors with the aircraft in the tilted position, a second center of gravity location in the first plane for the tilted aircraft;
            compare the first center-of-gravity location to the second center-of-gravity location to determine a component of the first center-of-gravity location along a fuselage axis to determine a three-dimensional center-of-gravity of the aircraft; and
            move a load of the aircraft to a location along the third axis that provides stability for horizontal and vertical flight modes, based on the component of the first center-of-gravity location along the third axis.

14. The VTOL aircraft as recited in claim 13, wherein each force sensor is embedded within a respective one of the landing gears.

15. The VTOL aircraft as recited in claim 13, wherein the three-dimensional center-of-gravity system includes a status indicator operatively connected to the module to provide a status of a cargo load in the aircraft.

16. The VTOL aircraft as recited in claim 13, wherein the strut is an oleo strut.

17. The VTOL aircraft as recited in claim 16, further comprising a valve and a pump operatively connected to the strut to at least one of depress or refill the oleo strut.

18. The VTOL aircraft as recited in claim 13, further comprising a nacelle supported on each main wing defining a nacelle axis extending parallel to the vertical axis, and a pair of vertical tail wings extending opposite from one another radially outward from each nacelle.

19. The VTOL aircraft as recited in claim 18, wherein the plurality of landing gears are each operatively connected to a respective one of the vertical tail wings.

* * * * *